B. SWIFT.
Coffee Mill.
No. 4,149. Patented Aug. 16, 1845.
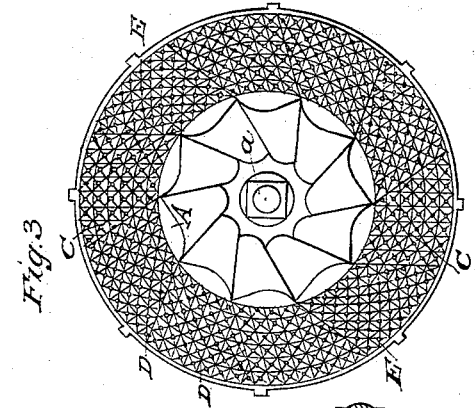
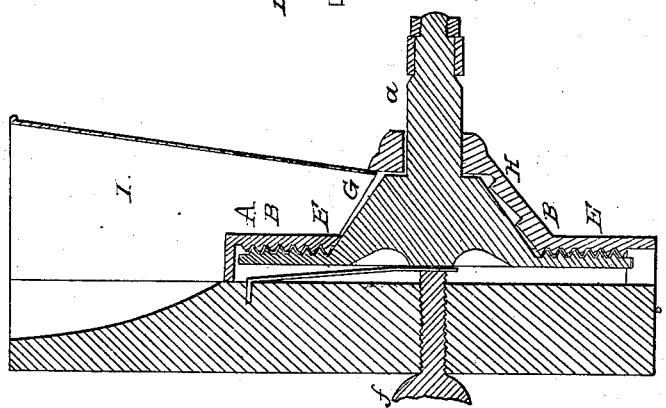
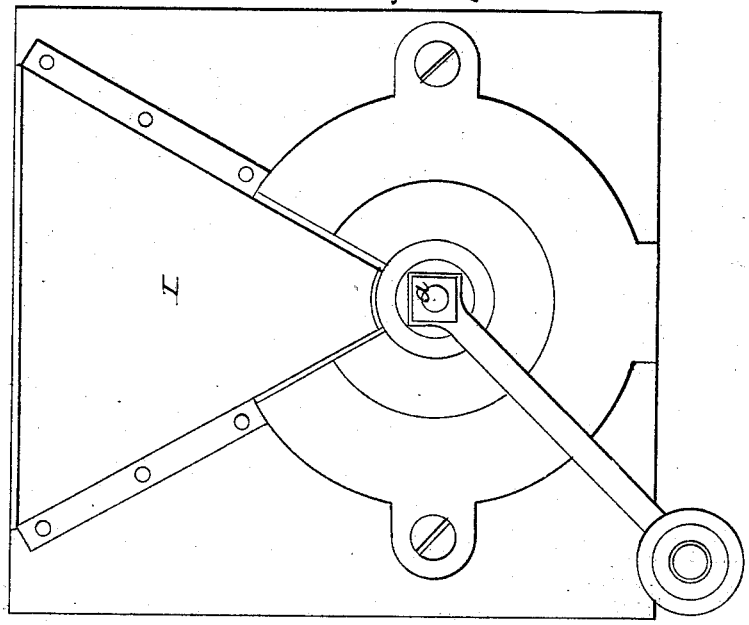

UNITED STATES PATENT OFFICE.

BERIAH SWIFT, OF WASHINGTON, NEW YORK.

GRINDING-MILL.

Specification of Letters Patent No. 4,149, dated August 16, 1845.

*To all whom it may concern:*

Be it known that I, BERIAH SWIFT, of the town of Washington, in the county of Dutchess and State of New York, have invented an Improvement in Mills for Grinding Bark for Tanners' Use, Coffee, Spices, &c.; and I do hereby declare that the following is a full, clear, and exact description thereof, reference being had to the accompanying drawings, which make part of this specification, in which—

Figure 1 is a view of a coffee or spice mill. Fig. 2 a vertical section through the axes of the plates showing the extension of the teeth of one plate into the spaces between the teeth of the other. Fig. 3, a view of one of the plates detached in which one set of grooves is cut along circles concentric with the axis of the plate, and the other set along lines laid off according to what is termed the "eight quarter dress" of a mill plate.

My invention consists in cutting the inner or grinding surfaces of the mill plates into circular rows of teeth, concentric with the axis of the plate and projecting from the surfaces of the plates, so arranged that the teeth of one plate extend into the spaces between the rows of teeth of the other in combination with furrows in depth equal to the teeth and in lines running from the inner periphery outward technically termed "eight quarter dress" and also in combining with this arrangement of teeth on the plates a cone or cylinder of breaking teeth to prepare the grain, &c., &c., for the grinding teeth by which I increase very greatly the quantity of grinding surface in a mill of given size and enable it more effectually, uniformly and quickly to grind the substance under treatment.

A, is the runner or grinding plate provided with a shaft *a*, to receive a crank handle, pulley or other device for receiving motion from a first move, and with a temper screw *f* or some analogous means of regulating the distance between it and the permanent plate or bed B. The central part of the plate is provided with a cone of breaking teeth G made in the usual manner, the form of this part and the arrangement of the breaking teeth not being material as they make no part of my invention. The permanent plate or bed B is provided with a hollow cone of breaking teeth H corresponding with the breaking teeth on the runner and also with corresponding teeth E, arranged in like manner as those on the runner and fitting in the spaces between them and receiving the teeth of the runner between them, by means of which the grinding surface is greatly increased.

The furrows D, Fig. 3, for the passage of the substances under the action of the grinders extend from the breaking teeth to the outer periphery of the plates and they may be made to run in any direction provided they leave passages through which the grain, &c., may pass from the breaker outward and be discharged at the periphery of the plates, although I prefer to make them run in the directions corresponding with what is termed by millers the eight quarter dress as represented in Fig. 3 of the accompanying drawings. The manner in which the concentric rows of teeth in the runner and bed fit into each other is represented in Fig. 2 of the drawings.

A hopper I is provided for the delivery of the grain or other substances to the breaker; the arrangement of this and other parts depending of course upon the kind of substance to be ground and the intended position of the mill, whether vertical or horizontal.

It should be observed that I do not confine myself to the precise form of teeth represented, as these may be varied so long as they are made to project from the surfaces of the plates.

What I claim as my invention and desire to secure by Letters Patent is—

1. Making the grinding teeth of mills in concentric rows projecting from the surface of the plates so that the teeth of one plate shall run in the spaces between the teeth on the other, and vice versa in combination with the grooves or furrows running toward the periphery of the plates through which the substances acted upon are carried outward whether these furrows be arranged radially according to what is technically termed the eight quarter dress or in any other manner leading from the inner to the outer range of teeth.

2. And I also claim in combination with the teeth arranged as expressed in the above claim the breaking teeth on a cylinder or cone arranged substantially as herein described and for the purpose specified.

BERIAH SWIFT.

Witnesses:
ISAAC LAWTON,
HENRY C. HAIGHT.